(12) United States Patent
Baumeister et al.

(10) Patent No.: US 6,309,294 B1
(45) Date of Patent: Oct. 30, 2001

(54) LAB-HOOD VENT SYSTEM

(75) Inventors: Gregor Baumeister, Krefeld; Manfred Sadkowski, Geldern; Thomas Sefker; Sven Wedler, both of Neukirchen-Vluyn, all of (DE)

(73) Assignee: Gebruder Trox, Gesellschaft mit beschrankter Haftung, Neukirchen-Vluyn (DE)

( * ) Notice: Subject to any disclaimer, the term of this patent is extended or adjusted under 35 U.S.C. 154(b) by 0 days.

(21) Appl. No.: 09/649,631

(22) Filed: Aug. 28, 2000

(30) Foreign Application Priority Data

Aug. 30, 1999 (DE) .......................................... 299 15 190 U

(51) Int. Cl.$^7$ ...................................................... B08B 15/02
(52) U.S. Cl. ................................................ 454/61; 454/56
(58) Field of Search ............................................ 454/61, 56

(56) References Cited

U.S. PATENT DOCUMENTS 5,304,093 * 4/1994 Sharp et al. ........................... 454/61
5,415,583 * 5/1995 Brandt, Jr. .............................. 454/61
5,518,446 * 5/1996 Jacob ...................................... 454/61

* cited by examiner

Primary Examiner—Jiping Lu
(74) Attorney, Agent, or Firm—Herbert Dubno; Andrew Wilford

(57) ABSTRACT

A generally closed lab hood having an opening closable by a movable door and connected to a variable-throughput suction source has a vent-control system having a sensor for detecting a velocity of flow of air into the hood and for generating an output corresponding to the detected velocity. A controller connected to the sensor and to the variable-throughput suction source receives the output and operates the suction source to set throughput of the source at a level corresponding to the output so that as the detected velocity increases the throughput of the suction source is increased and vice versa. The controller includes a sensor tube having an inner end opening into the hood and an outer end opening outside the hood and a sensor in the tube for detecting the velocity of air-flow therethrough. This tube is offset from the opening. The controller operates proportionally to set the throughput of the suction source relative to the air-flow velocity.

4 Claims, 1 Drawing Sheet

LAB-HOOD VENT SYSTEM

FIELD OF THE INVENTION

The present invention relates to a vent system for a safety enclosure. More particularly this invention concerns a vent for a lab hood having an openable access door.

BACKGROUND OF THE INVENTION

A standard lab hood is an enclosure one side of which can be opened by means of a movable door, typically an upwardly slidable glass panel. The top of the hood is connected via a branch duct to a main vent duct that is normally continuously evacuated by a vent fan. The branch duct is provided with a shutter that can be moved from a position completely blocking air flow up the branch duct to a position exposing virtually the entire flow cross section of the branch duct for maximum flow. The main duct is maintained continuously under a predetermined subatmospheric pressure.

In order to avoid running the exhaust system at a given hood it is known to mechanically couple the door of the hood to the respective shutter so that, as the door is closed the shutter is closed and vice versa. This ensures that when the door is open there will be sufficient suction to prevent any escape of gases from the hood. When, however, the door is closed there will be little venting and, therefore, little waste of heated or cooled room air and of energy running the suction source. The suction control can be gradual, controlled by a pontentiometer or the like operated as the door is raised and lowered, or two-stage, controlled by end switches operated by the door. At best such systems approximate ideal circumstances.

OBJECTS OF THE INVENTION

It is therefore an object of the present invention to provide an improved vent system for a safety enclosure such as a lab hood.

Another object is the provision of such an improved vent system for a safety enclosure such as a lab hood which overcomes the above-given disadvantages, that is which accurately and sensitively controls venting of the hood.

SUMMARY OF THE INVENTION

A generally closed lab hood having an opening closable by a movable door and connected to a variable-throughput suction source has a vent-control system having according to the invention a sensor for detecting a velocity of flow of air into the hood and for generating an output corresponding to the detected velocity. A controller connected to the sensor and to the variable-throughput suction source receives the output and operates the suction source to set throughput of the source at a level corresponding to the output so that as the detected velocity increases the throughput of the suction source is increased and vice versa.

Thus with this system the only really critical factor—air flow from the outside into the hood—is directly monitored and the suction source is controlled to keep this flow at a desired level. No matter what is going on, there will be a certain air flow into the hood. Thus in a situation where the hood is closed but a reaction inside the hood is generating massive amounts of gas, the suction will be set high, unlike the prior-art systems which set the suction rate purely in response to door position so that under these circumstances the suction rate would be very low.

The controller includes a sensor tube having an inner end opening into the hood and an outer end opening outside the hood and means in the sensor tube for detecting the velocity of air-flow therethrough. This tube is mounted at a distance from the opening. It can be a small-diameter tube extending through the roof of the hood so that this system can easily be retrofitted to existing equipment.

In addition according to the invention the controller operates proportionally to set the throughput of the suction source relative to the air-flow velocity. Thus there is a direct relationship between suction-source throughput and detected air-flow velocity.

The suction source includes a stepless actuator capable of steplessly varying throughput of the source and connected to the controller. The source has an intake duct and a shutter pivotal in the duct to vary a flow cross section of the duct. The actuator has a link including a spring connected to the shutter. This spring gives a damping effect so that a sudden pressure change will not create an instantaneous response that could be incorrect.

BRIEF DESCRIPTION OF THE DRAWING

The above and other objects, features, and advantages will become more readily apparent from the following description, reference being made to the accompanying drawing whose sole FIGURE is a largely schematic and partly sectional view of the system of this invention.

SPECIFIC DESCRIPTION

Figure 1:
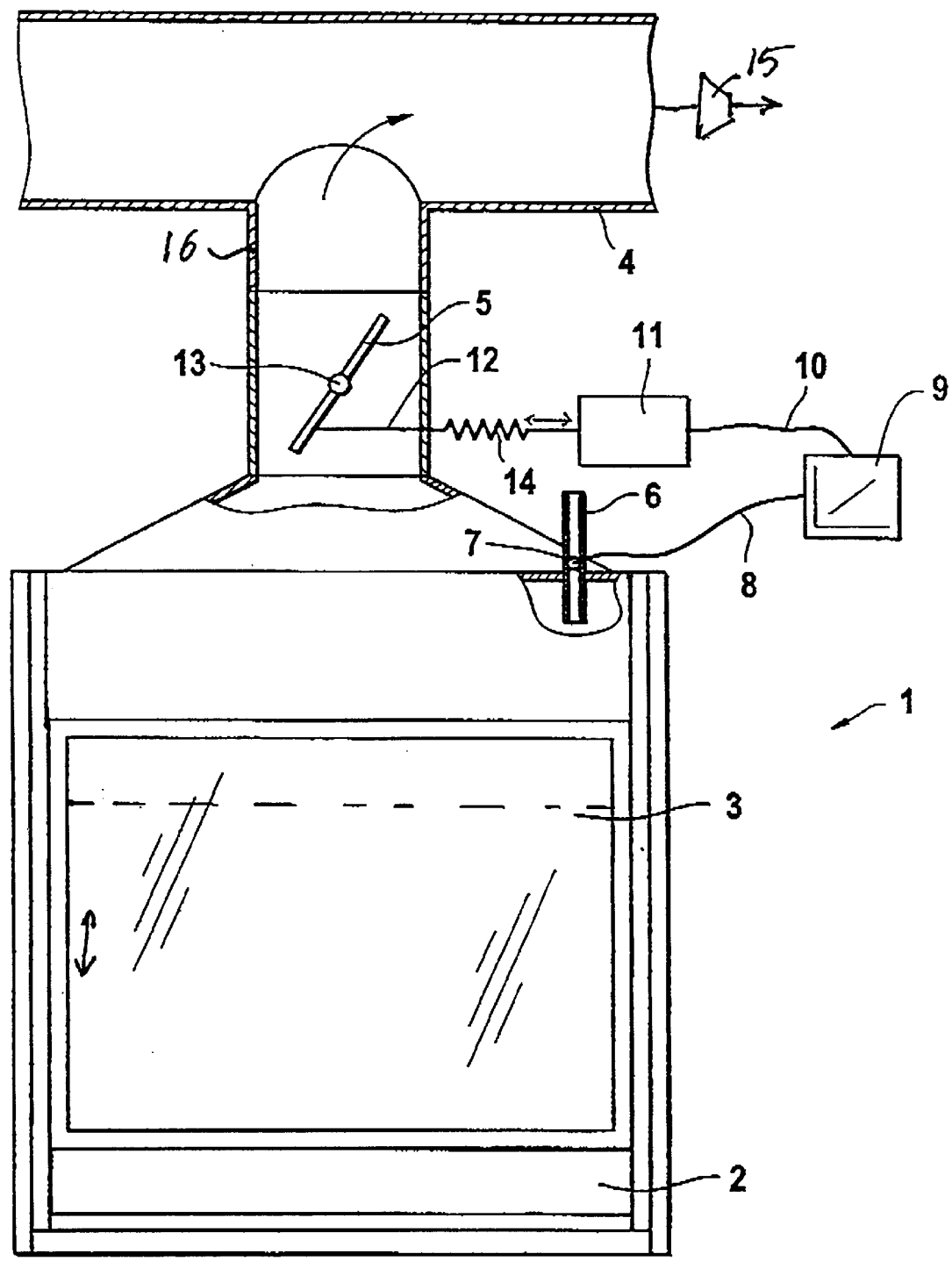

As seen in the drawing a lab hood 1 formed as an enclosure has an opening 2 closable by a door 3, here shown slid upward somewhat to expose a lower portion of the opening 2. A main duct 4 that is continuously maintained under subatmospheric pressure by a main blower 15 has a plurality of branch ducts 16 (only one shown) each connected at the top of a respective hood 1 and each provided with a respective circular flow-control shutter 5.

An actuator 11 is connected via a link element 12 to the shutter 5 offset from its pivot axis 13 which extends diametrally through the shutter 5 and duct 16. A spring 14 built into the link 12, which can be a simple rod, provides a damping effect.

According to the invention another small conduit 6 is provided in the roof of the hood 1, with an outer end open outside the hood 1 and an inner end inside the hood 1. Inside this conduit 6 is a sensor 7 which detects the velocity of air flow through the conduit 6 and feeds an output corresponding to this detected velocity via a line 8 to a proportional controller 9 connected via another line 10 to the actuator 11. The sensor 7 can be a simple spring-loaded flap connected to a strain gauge. The proportional controller 9, which can be electronic or even pneumatic, thus sets the position of the shutter flap 5 according to the flow of air through the conduit 6.

Thus the amount of air sucked out of the hood 1 will be a function, not of the position of the window 3, but of the differential of pressure between the inner and outer ends of the conduit 6. As a rule, of course, this differential will be determined by how wide the door 3 is open, but in some circumstances, for instance when a reaction that generates massive amounts of gas is being conducted in the hood 1, this relationship does not hold. In effect the controller 9 tries to maintain the differential between the pressure inside the hood 1 and outside the hood 1 constant, so that nothing can escape from the hood 1. Thus when the door 3 is closed the shutter 5 will close the duct 16 almost completely so that venting is minimized, as only minor suction applied through the duct 16 to a closed hood 1 will be sufficient to maintain the desired differential. When the door 3 is open or a reaction inside the hood 1 is generating gas, the shutter 5 will be more open to provide adequate venting.

We claim:

1. In combination with a generally closed lab hood having an opening closable by a movable door and connected to a variable-throughput suction source, a vent-control system comprising:

a tube mounted in the hood at a distance from the opening and having an inner end opening into the hood and an outer end opening outside the hood;

sensor means in the tube for detecting the velocity of air-flow therethrough and for generating an output corresponding to the detected velocity; and control means connected to the sensor means and to the variable-throughput suction source for receiving the output and operating the suction source to set throughput of the source at a level corresponding to the output, whereby as the detected velocity increases the throughput of the suction source is increased and vice versa.

2. The lab-hood vent-control system defined in claim 1 wherein the control means operates proportionally to set the throughput of the suction source relative to the air-flow velocity.

3. The lab-hood vent-control system defined in claim 1 wherein the suction source includes a stepless actuator capable of steplessly varying throughput of the source and connected to the control means.

4. The lab-hood vent-control system defined in claim 3 wherein the source has an intake duct and a shutter pivotal in the duct to vary a flow cross section of the duct, the actuator having a link including a spring connected to the shutter.

* * * * *